No. 841,016. PATENTED JAN. 8, 1907.
P. A. JENSEN.
HOOF TRIMMER.
APPLICATION FILED MAR. 23, 1906.
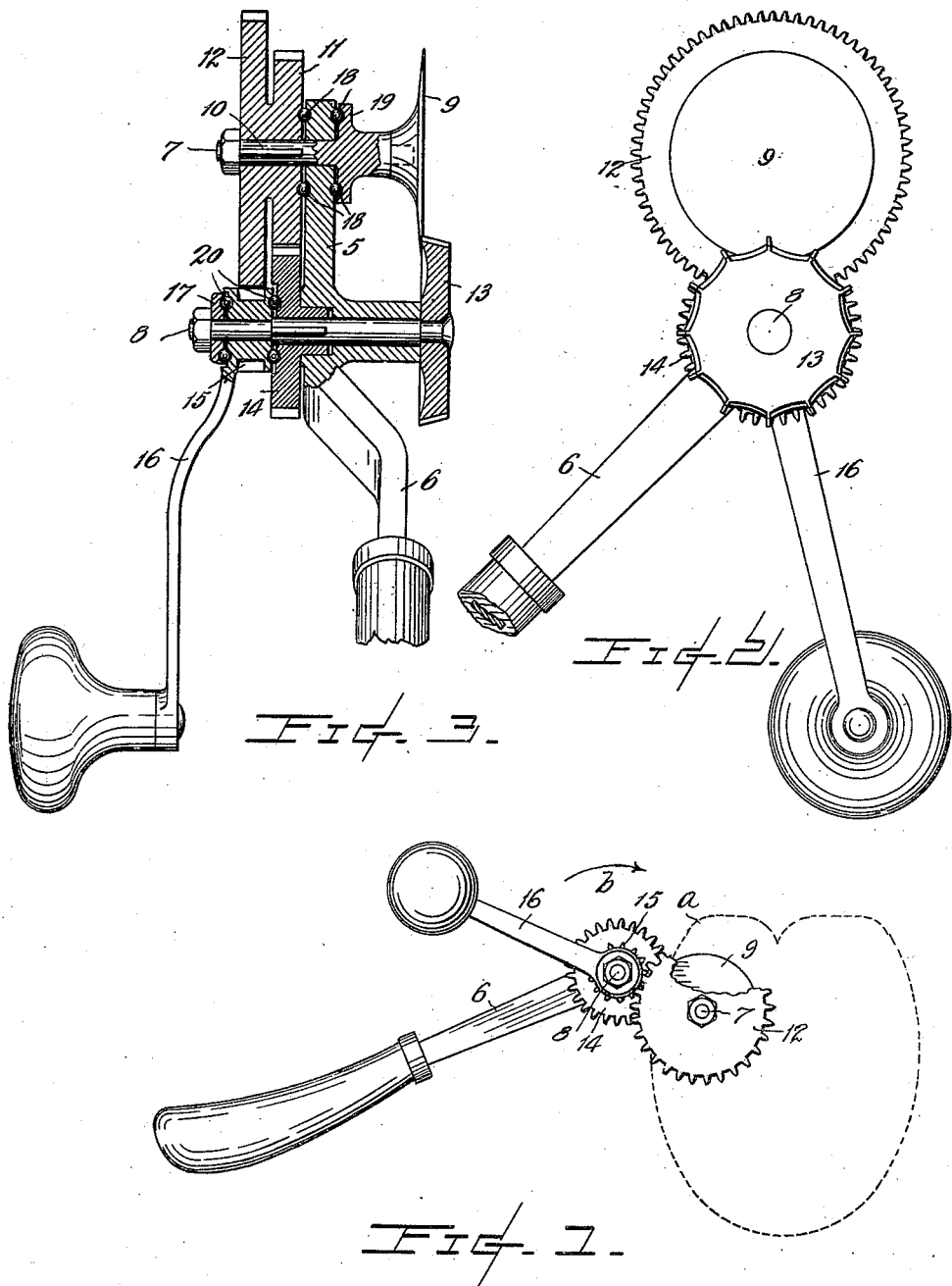
WITNESSES:
INVENTOR
Peter A. Jensen
BY
his ATTORNEY

UNITED STATES PATENT OFFICE.

PETER A. JENSEN, OF SEATTLE, WASHINGTON.

HOOF-TRIMMER.

No. 841,016.    Specification of Letters Patent.    Patented Jan. 8, 1907.

Application filed March 23, 1906. Serial No. 307,663.

*To all whom it may concern:*

Be it known that I, PETER A. JENSEN, of Seattle, in the county of King and State of Washington, have invented certain Improvements in Hoof-Trimmers, of which the following is a specification.

My invention relates to apparatus employed for trimming the hoofs of horses or the like preparatory to shoeing; and its object is to provide a device of this character which is capable, even in the hands of an inexperienced man, of being operated to trim the bottom of an animal's hoof to an unbroken surface and afford a good seat for the shoe.

The invention consists in the novel construction and arrangement of parts, hereinafter described and illustrated in the accompanying drawings, wherein—

Figure 1 is a top side view, partly broken away, showing an embodiment of my invention in its preferred form; Fig. 2, an enlarged under side view of the same, and Fig. 3 a cross-section view taken through Fig. 2.

In the drawings, 5 designates a frame provided with a handle-arm 6, whereby the device is held and its action directed. 7 and 8 are arbors journaled in said frame and projecting outwardly therefrom at the top and bottom sides. Upon one end of the arbor 7 is detachably mounted a disk-shaped cutter 9 and at its other end, by key 10 or otherwise, gear-wheels 11 and 12 of unequal diameters desirably. The arbor 8 has rigidly secured thereto a peripherally-spurred feed-wheel 13 in juxtaposition with said cutter and of such diameter as to overlap the same. On this arbor is keyed or otherwise secured a gear-wheel 14, which meshes with the aforesaid gear 11, and also a loosely-mounted pinion 15 in mesh with the gear 12. The pinion 15 is formed integral with or made fast to an operating crank-handle 16 and is maintained against displacement by a collar 17. Antifriction-balls 18 are desirably employed between the frame and the gear 11 upon the one side and an annular flange 19 of the arbor 7 at the other side to relieve the latter of friction due to the thrust or endwise pressure, while like devices 20 are desirably utilized upon each side of the pinion on the other arbor.

The manner of trimming an animal's hoof is as follows: The handle-arm 6 is grasped in the left hand of the operator, and with it the device is brought to present the spur-wheel 13 firmly against the curved outer surface of the hoof of a foot, which is held between the legs, as customary with horseshoers, and commencing at the rear or heel, as at *a* in Fig. 1, and upon revolving the crank-handle with the other hand in the direction indicated by the arrow *b* the gearing causes the rotation of the cutter 9 and feed-wheel 13 in reverse directions, and the spurs of the latter engaging with the hoof cause the device to travel thereabout, and in so doing shears a layer of the same from beneath. It is obvious that the operator should exert sufficient pressure upon the arm 6 to keep the feed-wheel against the hoof and accommodate the movement of the frame by manipulating the arm to follow the shape of the foot during the progress of the cut.

Having described my invention, what I claim as new, and desire to secure by Letters Patent, is—

1. In a hoof-trimmer, the combination of a frame provided with a handle-arm, two arbors rotatable in the frame, a disk cutter carried by one of said arbors, a spur-wheel carried by the other of said arbors, and means operated by a handle to rotate said arbors in different directions.

2. In a hoof-trimmer, the combination of a frame provided with a handle-arm, two arbors rotatable in the frame, a disk cutter carried by one of said arbors, a spur-wheel carried by the other of said arbors, and means operated by a handle to rotate said arbors in different directions and at different rates of speed.

3. A hoof-trimmer comprising a frame provided with a handle-arm, two arbors rotatably mounted in said frame, a disk cutter carried by one of said arbors, a wheel provided with peripheral spurs carried by the other of said arbors, and in juxtaposition with said cutter, two gears fixedly mounted upon the cutter-carrying arbor and respectively engaging with a fixed gear and a loose gear mounted upon the wheel-carrying arbor, said two last-named gears, and a handle operatively connected with said loose gear.

4. A hoof-trimmer comprising a frame, two arbors rotatably mounted in said frame, a disk cutter carried by one of said arbors, a wheel provided with peripheral spurs carried by the other of said arbors and in juxtaposition with said cutter, two gears fixedly mounted upon the cutter-carrying arbor and respectively engaging with a fixed gear and a loose gear mounted upon the wheel-carrying arbor, said two last-named gears, a handle operatively connected with said loose gear, means to prevent the displacement of said loose gear, and antifriction devices.

In testimony whereof I affix my signature in presence of two witnesses.

PETER A. JENSEN.

Witnesses:
PIERRE BARNES,
JOHN C. HARPER.